US006357127B1

(12) United States Patent
Cochran

(10) Patent No.: US 6,357,127 B1
(45) Date of Patent: Mar. 19, 2002

(54) ANTENNA ALIGNMENT TOOL

(75) Inventor: Christopher B. Cochran, Pittsburgh, PA (US)

(73) Assignee: Bell Atlantic Mobile, Inc., Bedminster, NJ (US)

( * ) Notice: Subject to any disclaimer, the term of this patent is extended or adjusted under 35 U.S.C. 154(b) by 0 days.

(21) Appl. No.: 09/222,796

(22) Filed: Dec. 30, 1998

(51) Int. Cl.[7] .......................... G01C 15/00; H01Q 3/00
(52) U.S. Cl. .......................................... 33/286; 343/894
(58) Field of Search .......................... 33/286, 227, 1 G, 33/276, 277; 343/760, 894

(56) References Cited

U.S. PATENT DOCUMENTS

| | | | | |
|---|---|---|---|---|
| 2,679,105 A | * | 5/1954 | Herrick | 33/277 |
| 3,859,731 A | * | 1/1975 | Endo | 33/227 |
| 4,344,231 A | * | 8/1982 | Martinez | 33/1 G |
| 4,383,372 A | * | 5/1983 | Zane et al. | 33/276 |
| 5,467,531 A | * | 11/1995 | David | 33/277 |
| 5,819,426 A | * | 10/1998 | Virtanen | 33/1 G |
| 5,977,922 A | * | 11/1999 | Hemmingsen, II | 343/760 |
| 6,141,880 A | * | 11/2000 | Vircks | 33/1 G |
| 6,212,782 B1 | * | 4/2001 | Eisenmenger | 33/1 G |

FOREIGN PATENT DOCUMENTS

| | | | | |
|---|---|---|---|---|
| GB | 2188147 A | * | 9/1987 | 33/286 |

* cited by examiner

*Primary Examiner*—Randy W. Gibson
(74) *Attorney, Agent, or Firm*—McDermott, Will & Emery

(57) ABSTRACT

An alignment tool and method of making and using an alignment tool including a transparent substrate having indicium thereon to aid in aligning the antenna with an azimuth. The tool includes a transparent substrate, a series of indicia, and a receiving portion adapted to receive a mounting structure of the antenna. The tool preferably includes a bearing indicium used during the making of the tool that represents an azimuth along which the antenna is to be aligned, a reference indicium used during the alignment of the antenna to align the tool with the antenna, and a landmark indicium used during the alignment of the antenna to align the tool with a distant landmark. The alignment tool is constructed using a topographical map that includes geographic markings for the antenna, the azimuth corresponding to the transmission direction of the antenna, and a distant landmark. The tool is used by positioning the receiving portion over the mounting structure of the antenna, aligning the reference indicium with the antenna, and aligning the landmark indicium with the distant landmark. The landmark indicium is oriented on the transparent substrate such that when the landmark indicium is aligned along a radial extending from the axis of the tool to the landmark, the bearing indicium is aligned with the azimuth.

18 Claims, 4 Drawing Sheets

ANTENNA ALIGNMENT TOOL

FIELD OF THE INVENTION

The present invention relates to alignment tools, and in particular, to an alignment tool and a method of making and using the alignment tool to align an antenna such as the antenna of a base station of a wireless communications system.

BACKGROUND OF THE INVENTION

Wireless communication systems are constructed by placing wireless device, such as antennas, in strategic locations and aiming the antennas so that information can be transmitted and received between antennas in neighboring cells and to areas within the antenna's cell. Typically the antennas are mounted on the top of a tower using a triangular structure or hat 200 depicted in FIG. 7. The triangular structure 200 includes three antenna arrangements 210, 220, and 230 that are aimed along azimuths 218, 228, and 238, respectively, that are each separated by 120 degrees and are designed to transmit and receive information within a sector in front of the respective antenna arrangements. The antenna arrangements 210, 220, and 230 each include three individual panel antennas or sectored antennas that transmit energy in a specific direction. Specifically, antenna arrangement 210 includes antennas 212, 214, and 216, antenna arrangement 220 includes antennas 222, 224, and 226, and antenna arrangement 230 includes antennas 232, 234, and 236. The antennas are conventionally mounted to the triangular structure 200 by attachment to a standard 2½ inch pipe 202.

In order to provide full and continuous coverage within each cell of a wireless communication system, proper alignment of each individual antenna is essential. A great deal of resources are spent in developing and optimizing wireless networks to accommodate as many users as the system will bear. Since a wireless communication system operates in a celled layout, each individual antenna is responsible for not only transmitting information to and receiving information from customers within their respective cell, but also for relaying information from cell site to cell site. If a single antenna in the wireless communication system is improperly aligned, an area within the wireless communication system is created that is not properly covered by an antenna. The result of having an improperly aligned antenna is the creation of an area in which the customer will receive poor transmission and reception quality or will receive no signal, thereby leaving a hole in the wireless communication system. A second result of having an improperly aligned antenna is an overall system performance problem due to the resulting poor relay signal. Realignment of an incorrectly aligned antenna is extremely costly as it requires a substantial amount of time to travel to the cell site, align the antenna and test the cell in order to ensure the problem has been corrected.

Currently antennas are aligned using a magnetic compass. An engineer typically determines the direction of the proper azimuth, and a technician aligns the antennas according to the reading of the compass essentially so that the antenna beam points along the compass heading matching the designated azimuth. The use of a compass to align the antennas can be very inaccurate since the antennas are typically mounted at the top of a steel tower or structure that can cause significant interference (e.g., ±20 degrees) with the magnetic reading of the compass. The accuracy of the alignment may not be immediately detected by the engineer, but rather may be detected by complaints from customers or through sampling of the signal from the antenna throughout the coverage area of the antenna.

Consequently, a need exists for a tool that can be used to accurately and efficiently align an antenna, thereby reducing the need for realignment of the antenna. Additionally, the accuracy of the alignment tool should not be susceptible to interference from the surrounding structure upon which the antenna is mounted.

SUMMARY OF THE INVENTION

The present invention provides an alignment tool and a method of making and using the alignment tool to accurately and efficiently align an antenna along an azimuth. The present invention achieves this result by providing a tool having indicium thereon to allow an engineer to align the tool with the antenna and to align the tool with a predetermined landmark. The alignment tool of the present invention overcomes the disadvantages of using a magnetic compass since the tool does not use magnetism to align the antenna and, therefore, is not susceptible to interference from the surrounding structure upon which the antenna is mounted.

The present invention advantageously provides an embodiment that includes a transparent substrate that is preferably planar and is made of a lightweight, durable, shatterproof sheet of material such a clear plastic. The tool includes a series of indicia that enable the tool to be used to align an antenna with its respective azimuth. The alignment tool includes a receiving portion adapted to receive a mounting structure of the antenna The receiving portion of the tool includes an axis and is configured such that when the tool receives the mounting structure an adjustment axis of the antenna is coaxial with the axis of the tool.

The tool preferably includes a bearing indicium, a reference indicium, and at least one landmark indicium. The bearing indicium is used during the making of the tool and represents an azimuth along which the antenna is to be aligned. The reference indicium is used during the alignment of the antenna to align the tool with the antenna. Generally, speaking the reference indicium is shaped to match a known feature on the antenna, for example a rear surface thereof, and to provide a reference such that when the reference indicium is aligned with the known feature on the antenna then the bearing indicium should be aligned with the transmission direction of the antenna. The landmark indicium is used during the alignment of the antenna to align the tool with a distant landmark. The bearing indicium and the landmark indicium are positioned along a radial extending from the axis of the tool. The landmark indicium is oriented on the transparent substrate such that when the landmark indicium is aligned along a radial extending from the axis of the tool to the landmark, the bearing indicium is aligned with the azimuth and the reference indicium can then be used to align the antenna with the azimuth.

The alignment tool is constructed using a topographical map that includes geographic markings for the antenna, the azimuth corresponding to the transmission direction of the antenna, and a distant landmark. Once the topographical map is constructed and the layout on the topographical map is complete, the transparent substrate having an axis and a bearing indicium marked thereon is positioned on the map such that the axis is directly aligned with the marking for the antenna and the bearing indicium is directly aligned with the marking for the azimuth. The landmark indicium is then made on the transparent substrate along a radial extending from the marking for the antenna to the marking for the landmark.

Once the landmark indicium is formed on the tool along with the reference indicium and the bearing indicium, the alignment tool is brought to the top of the tower for alignment of the antenna. The receiving portion of the tool is slid over the mounting structure of the antenna such that the tool is positioned above the antenna. The preferred method of using the tool includes an engineer obtaining a vantagepoint above the antenna and aligning the reference indicium such that it is parallel to an edge on a rear surface of the antenna. The transparent nature of the substrate will allow the engineer to view the edge through the substrate. The method of using the alignment tool further includes pivoting the antenna about the adjustment axis and pivoting the tool about the axis of the tool until the landmark indicium is directly aligned with a radial extend from the axis of the tool to the landmark. The antenna should now be aligned with the correct azimuth.

Additional advantages and other features of the invention will be set forth in part in the description which follows and in part will become apparent to those having ordinary skill in the art upon examination of the following or may be learned from the practice of the invention. The advantages of the invention may be realized and obtained as particularly pointed out in the appended claims.

DETAILED DESCRIPTION OF THE INVENTION

The present invention advantageously provides an alignment tool and a method of making and using the alignment tool to accurately and efficiently align an antenna along an azimuth.

Figure 1:
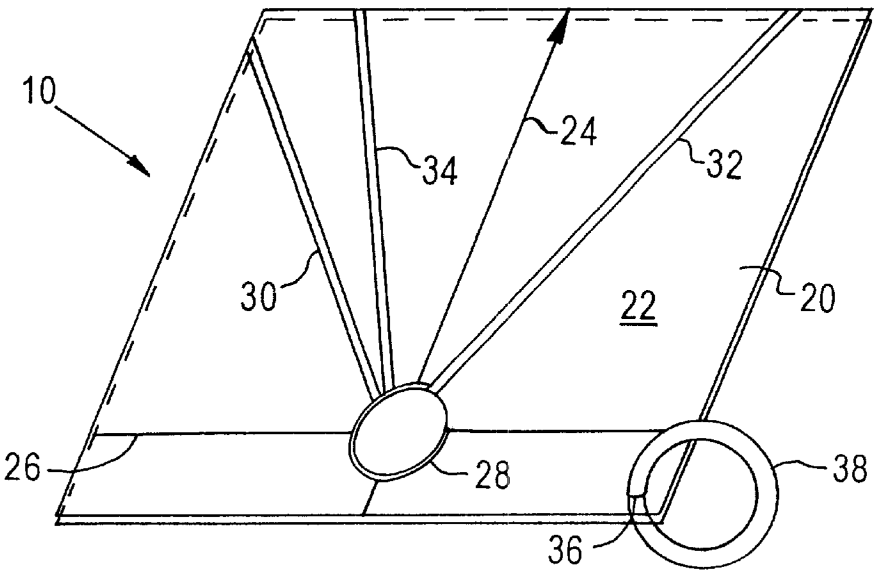
FIG. 1 is a perspective view of a first embodiment of an antenna alignment tool according to the present invention.

FIG. 1 depicts a first exemplary embodiment of an alignment tool 10 according to the present invention. The alignment tool 10 includes a transparent substrate 20 that is preferably planar with a flat upper surface 22 and has either a rectangular or square shape. Since the alignment tool 10 will be carried up a tower by an engineer, the transparent substrate 20 is preferably made of a lightweight, durable, shatterproof sheet of material such as clear plastic, e.g., Plexiglas™, although other materials can be used such as glass or other types of plastic.

Figure 7:
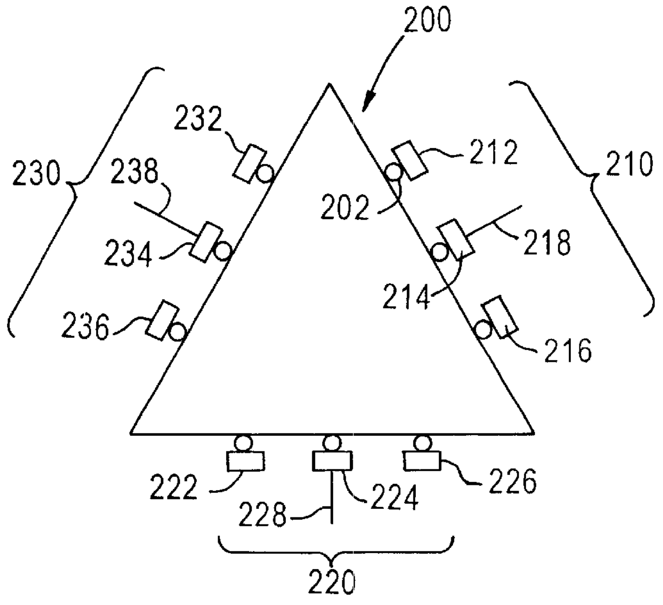
FIG. 7 is a top diagrammatic view of a conventional triangular mounting structure used to mount antennas in three sectors.

The tool 10 includes a series of indicia that enable the tool 50 to be used to align the antennas, for example those depicted in FIG. 7, with their respective azimuths. The tool 10 preferably includes a bearing indicium 24, a reference indicium 26, and at least one landmark indicium, depicted herein as 30, 32, and 34. The bearing indicium 24 is used during the making of the tool 10 and represents an azimuth along which the antenna is to be aligned. The reference indicium 26 is used during the alignment of the antenna, which will be discussed in detail below with reference to FIGS. 3 and 4. Generally, speaking the reference indicium 26 is shaped to match a known feature on the antenna, for example a rear surface thereof. The indicium 26 provides a reference such that when the reference indicium 26 is aligned with the known feature on the antenna then the bearing indicium 24 should be aligned with the transmission direction of the antenna. Since the rear surface of the antenna 100 is typically flat and since the rear surface generally extends in a direction perpendicular to the transmission direction of the antenna, the reference indicium 26 typically includes a transversely extending line that is perpendicular to the bearing indicium 24. The landmark indicia 30, 32, and 34 are used during the alignment of the antenna to align the tool 10 with a distant landmark. Preferably, the tool 10 includes three landmark indicia 30, 32, and 34, each of which is used for the alignment of a separate antenna arrangement 210, 220, and 230, depicted in FIG. 7.

Figure 3:
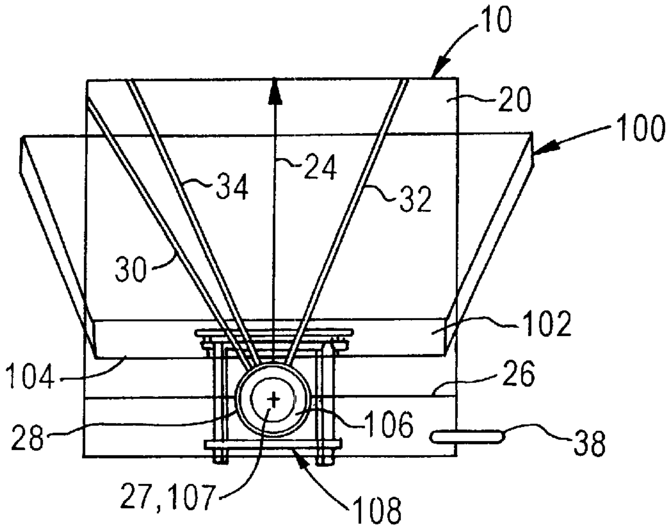
FIG. 3 is a top view of an alignment tool according to the present invention depicting a method of using the alignment tool.
Figure 4:
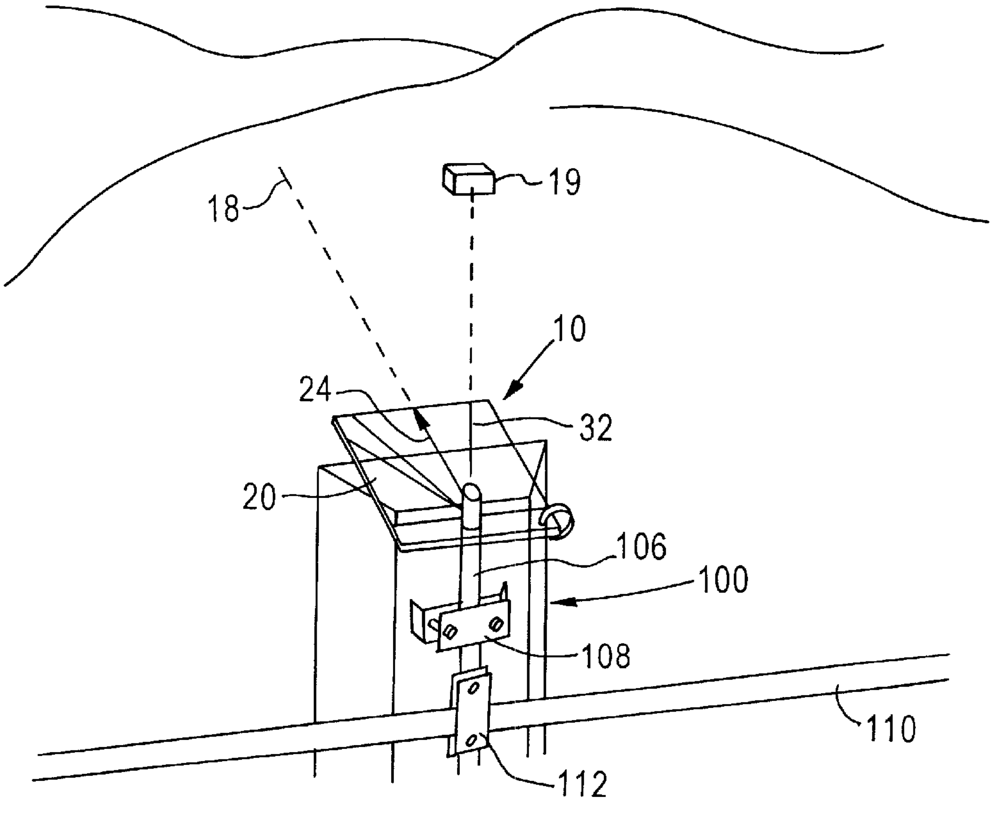
FIG. 4 is a perspective view of an alignment tool according to the present invention depicting a method of using the alignment tool.

The alignment tool 10 includes a receiving portion 28 adapted to receive a mounting structure of the antenna. The conventional mounting structure for an antenna is a pipe 106, as depicted in FIGS. 3 and 4. The antenna 100 is typically mounted to the pipe 106 using adjustable brackets 108. Note that the antenna 100 has a vertical adjustment axis 107 at the center of the pipe 106, about which the antenna 100 can be directionally adjusted. The receiving portion 28 of the tool 10 includes an axis 27 (depicted in FIGS. 2A–2C) and is configured such that when the mounting structure 106 is received by the tool 10 the adjustment axis 107 of the antenna 100 is coaxial with the axis 27 of the tool 10. The receiving portion is preferably a circular aperture extending through the transparent substrate 20, although other configurations such as different shapes of apertures or even recesses can be used provided the receiving portion 28 enables the alignment of axis 27 of the tool with adjustment axis 107 of the antenna. The bearing indicium 24 and the landmark indicium 30, 32, and 34 are positioned along a radii extending from the axis 27 of the tool 10.

The alignment tool 10 preferably includes an attachment device 38 connected to the transparent substrate 20 so that the engineer may attach the tool 10 to a belt or bag during the climb up the tower. In the exemplary embodiment depicted in FIG. 1 the attachment device 38 is a loop, for example a cable tie, extending through a hole 36 in the transparent substrate 20. A wide variety of attachment devices can be used with the present invention, for example, adjustable or removable attachment devices, devices that are glued or welded or otherwise relatively permanently attached to the tool 10, etc.

Figure 2A:
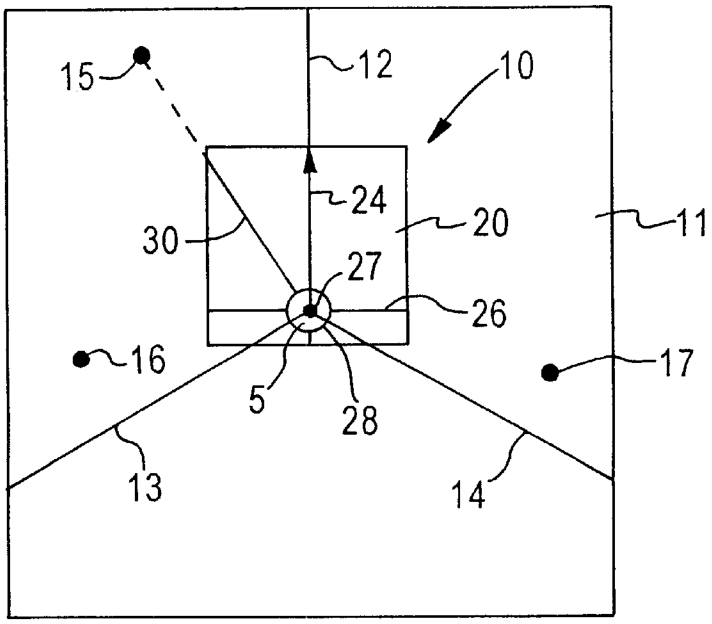
FIGS. 2A–2C are top plan views of a topographical map having an alignment tool thereon depicting a method of making the alignment tool.
Figure 2B:
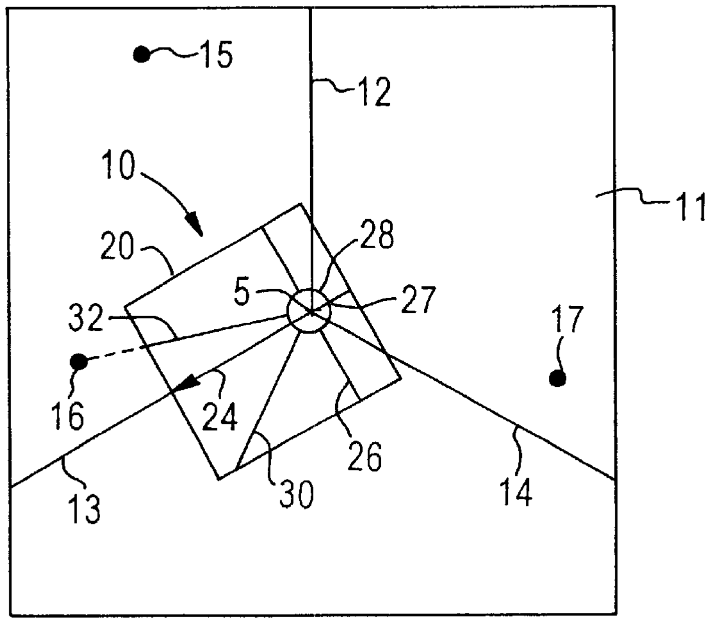
Figure 2C:
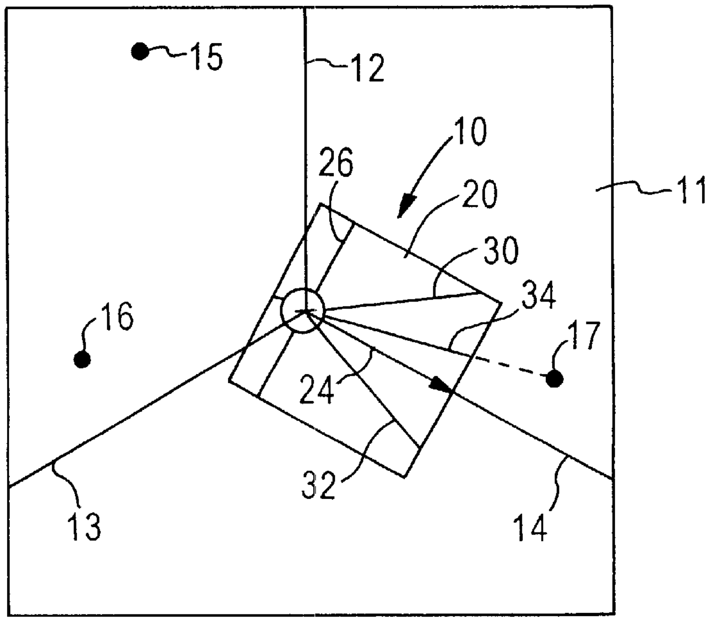

FIGS. 2A through 2C depict a method of making the first exemplary embodiment of the alignment tool 10 of the present invention. The method includes producing a transparent substrate 20 having a bearing indicium 24 drawn along the center of the transparent substrate 20 through axis 27 and a reference indicium 26 drawn perpendicular to the bearing indicium 24. The transparent substrate 20 at this stage is formed either with the receiving portion 28 not yet cut out of the substrate 20, or with the receiving portion 28 cut out of the substrate 20 and with a blank of the receiving portion positioned within the receiving portion 28, such that axis 27 is easily located with respect to the substrate 20. A topographical map 11 (7.5 minute surveyed data is preferred) is constructed that includes a point 5 that represents the position of the antenna under consideration, which can be estimated as the location of the tower upon which the antennas are to be mounted. The map 11 is also constructed to include three azimuth lines 12, 13, and 14 that represent azimuths of three antenna arrangements mounted on a triangular structure on the tower in a manner similar to that depicted in FIG. 7. The azimuths are selected as part of the process of designing the cellular system, so that the antennas on each side of the tower hat transmit and receive signals in the intended cell sector. The map 11 further includes three landmarks 15, 16, and 17 that are selected preferably at a distance of one or two miles from the tower in front of their respective antenna arrangements and are clearly visible from the tower, such as road intersections, large buildings, or easily identifiable natural landmarks. Alternatively, several landmarks are selected for each antenna arrangement to act as secondary checks to ensure the accuracy of the tool 10.

Once the topographical map 11 is constructed with the appropriate reference points, the transparent substrate 20 is positioned on the map 11 such that the axis 27 is directly aligned with the tower 5 and the bearing indicium 24 is directly aligned with the azimuth line 12, as depicted in FIG. 2A. At this position, landmark indicium 30 is made on the transparent substrate 20 along a radial extending from the tower 5 to the landmark 15. The transparent substrate 20 is rotated on the map 11 such that the axis 27 is directly aligned with the tower 5 and the bearing indicium 24 is directly aligned with the azimuth line 13, as depicted in FIG. 2B. At this position, landmark indicium 32 is made on the transparent substrate 20 along a radial extending from the tower 5 to the landmark 16. The transparent substrate 20 is rotated on the map 11 such that the axis 27 is directly aligned with the tower 5 and the bearing indicium 24 is directly aligned with the azimuth line 14, as depicted in FIG. 2C. At this position, landmark indiciuni 34 is made on the transparent substrate 20 along a radial extending from the tower 5 to the landmark 17. The landmark indicia may be labeled or given different characteristics (e.g. colors) to indicate which tower face and/or sector each indicium signifies.

Figure 5:
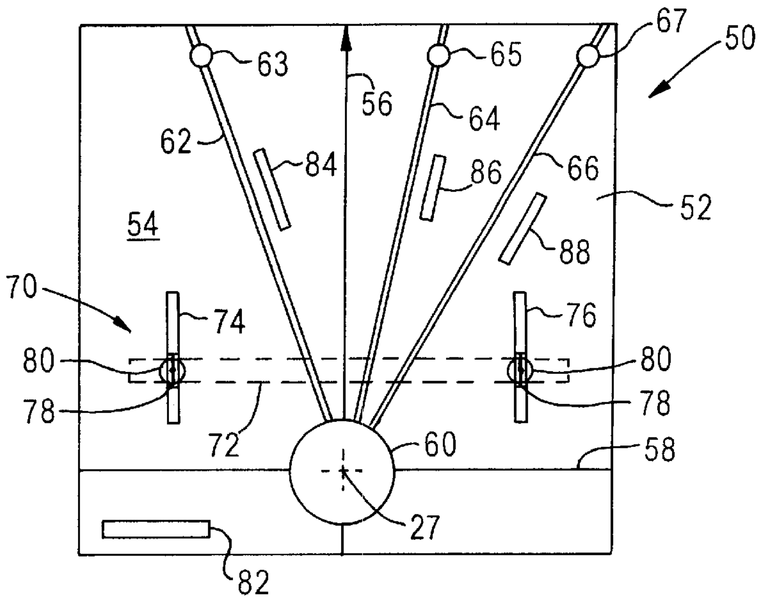
FIG. 5 is a top plan view of a second embodiment of an antenna alignment tool according to the present invention.

The bearing indicium 24, reference indicium 26 and landmark indicia 30, 32, and 34 can take many shapes and can be constructed in a wide variety of manners, as one skilled in the art will readily appreciate. For example, the indicia are preferably lines formed on the upper surface 22 of the transparent substrate 20. Preferably, the bearing indicium 24 and the reference indicium 26 are formed by constructing grooves in the upper surface 22 of the transparent substrate 20 and landmark indicia 30, 32, and 34 are formed by placing on the upper surface 22 of the transparent substrate 20 a thin strip of colored tape, such as automotive pinstriping, of various colors each corresponding to a specific antenna arrangement. In order to enhance the visibility of grooves used to form indicia, colored paint or ink may be placed within the groove. An alternate embodiment includes indicia embedded within the transparent substrate. A second exemplary embodiment 50 depicted in FIG. 5 is discussed below that includes pegs 63, 65, and 67 positioned along radials of the axis 27 that can be used either alone or in conjunction with lines 62, 64, and 66 to form the landmark indicia.

Once the bearing indicium 24, reference indicium 26 and landmark indicia 30, 32, and 34 are formed on the tool 10, the blank or piece of material within the receiving portion 28 is removed using a suitable process and an attachment device 38 is constructed if desired. The alignment tool 10 is then brought to the top of the tower for alignment of the antennas.

FIGS. 3 and 4 depict a method of using the exemplary embodiment of the alignment tool 10 according to the present invention to align an antenna 100. FIG. 3 is a top view of the alignment tool 10, where a mounting pipe 106 is positioned within the receiving portion 28 of the tool 10. The receiving portion 28 is slid over the pipe 106 such that the tool 10 is positioned above the antenna 100. The antenna 100 has a rear surface 102 that is typically mounted to the pipe 106 by two adjustable brackets 108 such that the antenna 100 is tilted slightly forward. The mounting pipe 106 is mounted to the triangular structure 110 by one or more brackets 112. The method of using the tool includes the engineer obtaining a vantage point above the antenna 100 as depicted in FIG. 3 and aligning the reference indicium 26 such that it is parallel to an edge of the rear surface 102 of the antenna, for example lower edge 104. The transparent nature of substrate 20 will allow the engineer to view the lower edge 104 through the substrate 20.

The method of using the alignment tool further includes pivoting the antenna 100 about adjustment axis 107 and pivoting the tool 10 about axis 27 until the landmark indicium 32 is directly aligned with a radial extend from axis 27 to the actual landmark 19 viewed from the tower. Once the landmark indicium 32 is aligned with landmark 19 and the reference indicium 26 is aligned with the rear surface 102 of the antenna 100, the bearing indicium 24 is directly aligned with azimuth 18 and therefore the antenna is properly aligned. Note that landmark 19 corresponds to reference point 16 on the topographical map 11 and azimuth 18 corresponds to azimuth line 13.

The process described above with reference to FIGS. 3 and 4 is repeated for each of the antennas in the antenna arrangement of antenna 100. The same process is used to align the antennas in the remaining antenna arrangements using their corresponding landmark indicia.

Figure 6:
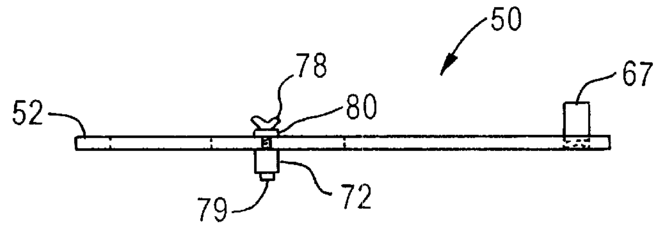
FIG. 6 is a side view of the second embodiment of an antenna alignment tool according to the present invention.

FIGS. 5 and 6 depict a second exemplary embodiment of an alignment tool 50, which is similar in many respects to the first exemplary embodiment. The alignment tool 50 includes a transparent substrate 52 that is preferably planar with a flat upper surface 54 and has either a rectangular or square shape. The tool 50 includes a series of indicia that enable the tool 50 to be used to align the antennas, for example those depicted in FIG. 7, with their respective azimuths. The tool 50 preferably includes as indicium a bearing indicium 56, reference indicium, and at least one landmark indicium. The second exemplary embodiment 50 includes pegs 63, 65, and 67 positioned along radials of the axis 27 that can be used either alone or in conjunction with lines 62, 64, and 66 to form the landmark indicia. The pegs 63, 65, and 67 can be permanently mounted to the transparent substrate 52 or they can be removably mounted to the transparent substrate 52, for example they may be threadably received within holes in the substrate 52. The alignment tool 50 further includes a receiving portion 60 adapted to receive a mounting structure of the antenna.

In order to indicate which tower the tool 50 is configured for use with the upper surface 54 of the transparent substrate 82 includes a label 82. Additionally, the second exemplary embodiment includes labels 84, 86, and 88 that are used to describe the landmark used to align the respective landmark indicia.

The second exemplary embodiment 50 has reference indicium that includes a fixed reference indicium 58 and an adjustable reference indicium 70. The fixed reference indicium 58 is identical to the reference indicium 26 described for the first exemplary embodiment. The adjustable reference indicium 70 includes a pair of parallel slots 74 and 76 in the transparent substrate 52. The slots 74 and 76 extend in a direction parallel to the bearing indicium 56. The adjustable reference indicium 70 further includes an elongated, preferably straight, member 72 extending between the slots 74 and 76 and attached to the transparent substrate by thumbscrews 78 that extend through a washer 80, extend through the slots 74 and 76, extend through the straight member 72, and are threadable engaged to nuts 79. The thumbscrews 78 are preferably captivated within the nuts 79 so that the thumbscrews 78 are not accidentally unscrewed from the nuts 79 and dropped from atop the tower. The straight member 72 is constructed of any type of rigid material and does not need to be constructed of a transparent material. In order to prevent the straight member 72 from becoming skewed from its intended orientation parallel to the fixed reference indicium 58, a tight tolerance is given between a portion of the thumbscrews extending through the slots 74 and 76 and the width of the slots 74 and 76.

The second exemplary embodiment of the present invention is used in a manner similar to the first exemplary embodiment except for the use of the adjustable reference indicium 70. The second exemplary embodiment of the tool 50 is positioned over the antenna in a manner identical to that depicted in FIG. 3. However, the adjustable reference indicium 70 can be adjusted such that the straight member 72 or an edge on the straight member 72 is aligned directly above the edge 104 of the rear surface 102 of the antenna 100. By moving the straight member 72 directly above the edge 104, the engineer will be able to precisely align the adjustable reference indicium 70 with the edge 104 without having a gap therebetween. Note that in this embodiment the fixed reference indicium 58 is not an essential feature, although it is preferably included in the structure of the tool 50 so that the engineer can compare the adjustable reference indicium 70 to the fixed reference indicium 58 to ensure they are parallel.

The present invention advantageously provides an alignment tool that overcomes the disadvantages of conventional alignment tools. One advantage of the present invention is that it provides an accurate and efficient tool for aligning an antenna without being susceptible to magnetic inference from the mounting structure.

In the previous descriptions, numerous specific details are set forth, such as specific materials, structures, processes, etc., in order to provide a thorough understanding of the present invention. However, as one having ordinary skill in the art would recognize, the present invention can be practiced without resorting to the details specifically set forth. In other instances, well known processing structures have not been described in detail in order not to unnecessarily obscure the present invention.

Only the preferred embodiment of the invention and an example of its versatility are shown and described in the present disclosure. It is to be understood that the invention is capable of use in various other combinations and environments and is capable of changes or modifications within the scope of the inventive concept as expressed herein.

What is claimed is:

1. A tool for aligning an antenna with an azimuth using a landmark, said tool comprising:

a substantially flat, rigid transparent substrate, the substrate having a receiving portion adapted to receive a structure of the antenna, said receiving portion being configured such that when the structure is received by said tool an alignment axis of the tool is substantially coaxial with an adjustment axis of the antenna;

wherein said receiving portion is an aperture extending through said transparent substrate;

a first indicium coupled to the substrate adapted to be used to align said tool with a reference surface on the antenna about the alignment axis of the tool; and a second indicium positioned on the substrate along a radial extending from said alignment axis of the tool, said second indicium having an angular relationship about said alignment axis of the tool with said first indicium such that when said tool is oriented such that said second indiciurn is positioned on a radial between the adjustment axis of the antenna and the landmark when viewed from proximity to the antenna and the first indicium is aligned with the reference surface of the antenna, the antenna will be aligned with the azimuth.

2. The tool according to claim 1, further comprising:

a third indicium positioned along a radial extending from said alignment axis of the tool, said third indicium having an angular relationship about said alignment axis of the tool with said first indicium such that when said tool is oriented such that said third indicium is positioned on a radial between an adjustment axis of a second antenna and a second landmark when viewed from proximity to the antenna and the first indicium is aligned with the reference surface of the second antenna, the second antenna will be aligned with a second azimuth.

3. The tool according to claim 1, wherein said transparent substrate is a planar sheet of material.

4. The tool according to claim 1, wherein said transparent substrate is clear plastic.

5. The tool according to claim 1, wherein said first indicium is a groove in the transparent substrate.

6. The tool according to claim 1, wherein said second indicium is a line of tape.

7. The tool according to claim 1, wherein said second indicium is a straight member adjustably connected to said transparent substrate.

8. The tool according to claim 1, wherein:

said first indicium extends linearly along the transparent substrate in a generally transverse direction; and said first indicium further includes a pair of parallel slots extending in a direction perpendicular to the transverse direction, said transparent substrate including a member having a straight edge extending between the pair of parallel slots, said member being adjustable mounted to the pair of parallel slots.

9. The tool according to claim 1, further comprising an attachment device connected to said transparent substrate.

10. The tool according to claim 1 wherein:

said first indicium extends linearly along the transparent substrate in a transverse direction; and said transparent substrate further comprises a third indicium positioned along a radial extending from said alignment axis, the radial extending in a direction perpendicular to the transverse direction.

11. A method of producing an alignment tool used for aligning an antenna with an azimuth, the method comprising the steps of:

forming an alignment tool including a transparent substrate having a first axis corresponding to an adjustment axis of the antenna and a first indicium positioned along a radial extending from the first axis;

constructing a topographical map representing an antenna, a landmark, and an azimuth;

positioning the alignment tool on the topographical map such that the first axis is aligned with the representation of the antenna and the first indicium is aligned with the representation of the azimuth; and forming a second indicium on the transparent substrate positioned along a radial extending from the first axis to the representation of the landmark.

12. The method of producing an alignment tool according to claim 11 further comprising the steps of:

forming a receiving portion adapted to receive a mounting structure of the antenna, the receiving portion being configured such that when the tool receives the mounting structure the adjustment axis of the antenna is coaxial with the first axis.

13. The method of producing an alignment tool according to claim 11, further comprising the steps of:

constructing a topographical map representing a second landmark, and a second azimuth;

positioning the alignment tool on the topographical map such that the first axis is aligned with the representation of the antenna and the first indicium is aligned with the representation of the second azimuth; and forming a second indicium on the transparent substrate positioned along a second radial extending from the first axis to the representation of the second landmark.

14. The method of producing an alignment tool according to claim 11, wherein the second indicium is formed by placing a line of tape along the radial extending from the first axis to the representation of the landmark.

15. The method of producing an alignment tool according to claim 11, further comprising the step of labeling the second indicium with a description of the landmark.

16. The method of producing an alignment tool according to claim 11, further comprising the step of forming a third indicium extending in a generally transverse direction along the transparent substrate and adapted to be used to align the tool with a reference surface on the antenna.

17. A method of using an alignment tool for aligning an antenna with an azimuth, the alignment tool including a transparent substrate having a first indicium adapted to be used to align the tool with a reference surface on the antenna about a first axis corresponding to an adjustment axis of the antenna and a second indicium positioned along a radial extending from the first axis, the second indicium having an angular relationship about the firs t axis with the first indicium such that when the tool is oriented such that the second indicium is positioned on radial between the adjustment axis of the antenna and the landmark and the first indicium is aligned with the reference surface of the antenna, the antenna will be aligned with the azimuth, the method comprising the steps of:

positioning the tool such that the first axis is coaxial with the adjustment axis of the antenna;

aligning the first indicium with the reference surface of the antenna; and aligning the tool and hence the antenna by sighting from proximity of the antenna along the second indicium so as to visually align the second indicium with the landmark while the first indicium is aligned with the reference surface on the antenna.

18. A method of using an alignment tool according to claim 17, wherein the first indicium includes a member having a straight edge extending in a transverse direction that is mounted to the substrate such that the member is adjustable in a direction perpendicular to the transverse direction, the method further comprising the step of:

adjusting the member such that the member is directly aligned with the reference surface on the antenna.

* * * * *